(12) United States Patent
Matsushita (10) Patent No.: US 10,382,637 B2
(45) Date of Patent: Aug. 13, 2019

(54) PRINT CONTROLLER, IMAGE FORMING SYSTEM, AND IMAGE FORMING APPARATUS

(71) Applicant: KONICA MINOLTA, INC., Chiyoda-ku, Tokyo (JP)

(72) Inventor: Kouichirou Matsushita, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/057,317

(22) Filed: Aug. 7, 2018

(65) Prior Publication Data
US 2019/0098146 A1 Mar. 28, 2019

(30) Foreign Application Priority Data
Sep. 22, 2017 (JP) ................................. 2017-182313

(51) Int. Cl.
*H04N 1/00* (2006.01)
*G03G 15/00* (2006.01)

(52) U.S. Cl.
CPC ....... *H04N 1/0083* (2013.01); *G03G 15/5016* (2013.01); *H04N 1/00021* (2013.01); *H04N 1/00068* (2013.01)

(58) Field of Classification Search
CPC .... G03G 15/50; G03G 15/5016; G03G 21/14; H04N 1/00938; H04N 1/0083; H04N 1/00068
See application file for complete search history.

(56) References Cited

U.S. PATENT DOCUMENTS

| 2009/0086257 A1* | 4/2009 | Harrington | H04N 1/00931 358/1.15 |
| 2009/0324274 A1* | 12/2009 | Bischel | G03G 15/5004 399/70 |
| 2010/0124427 A1* | 5/2010 | Sugiyama | G03G 15/0813 399/53 |
| 2014/0043634 A1* | 2/2014 | Haga | H04N 1/00904 358/1.13 |
| 2014/0168704 A1* | 6/2014 | Hasegawa | G06K 15/1823 358/1.15 |

FOREIGN PATENT DOCUMENTS

JP 2016022697 A 2/2016

* cited by examiner

*Primary Examiner* — Carla J Therrien
(74) *Attorney, Agent, or Firm* — Holtz, Holtz & Volek PC (57) ABSTRACT

A hardware processor includes: a communication part connected to the hardware processor; a rasterization processing time predictor that predicts a rasterization processing time required for rasterization processing; an output setting information extractor that extracts output setting information from print information about each page and transmits the output setting information to the hardware processor; a warm-up start time calculator that calculates a warm-up start time at which the hardware processor starts warm-up processing in accordance with productivity information about the hardware processor; a warm-up start notifier that notifies the hardware processor of a start of the warm-up processing, when a current time reaches the warm-up start time; a rasterization processor that transmits image data to the hardware processor, the image data being generated by performing the rasterization processing for each page; and a print start notifier that notifies the hardware processor of a print start after the warm-up processing is completed.

10 Claims, 8 Drawing Sheets

| PAGE | SHEET SIZE | BASIS WEIGHT | SHEET TYPE | POST-PROCESSING | PREDICTED AMOUNT OF TONER USE | | | |
|---|---|---|---|---|---|---|---|---|
| | | | | | C | M | Y | K |
| 1 | A4 | 100g/m² | PLAIN | ONE SIDE | 0% | 0% | 0% | 25% |
| 2 | A3 | 100g/m² | PLAIN | TWO SIDES | 10% | 15% | 15% | 0% |
| 3 | A3 | 100g/m² | PLAIN | TWO SIDES | 15% | 30% | 30% | 30% |
| 4 | A3 | 250g/m² | COATED | TWO SIDES | 20% | 30% | 20% | 50% |
| 5 | A3 | 250g/m² | COATED | TWO SIDES | 20% | 25% | 30% | 50% |

FIG. 5

| PAGE | PRINT PROCESSING TIME | PREDICTED WARM-UP OCCURRENCE TIME | PREDICTED WARM-UP PROCESSING TIME |
|---|---|---|---|
| 1 | 2.0 SECONDS | 6.0 SECONDS | 10.0 SECONDS |
| 2 | 4.0 SECONDS | 6.0 SECONDS | 10.0 SECONDS |
| 3 | 4.0 SECONDS | 6.0 SECONDS | 10.0 SECONDS |
| 4 | 6.5 SECONDS | 6.0 SECONDS | 12.0 SECONDS |
| 5 | 6.5 SECONDS | 6.0 SECONDS | 12.0 SECONDS |

PRINT CONTROLLER, IMAGE FORMING SYSTEM, AND IMAGE FORMING APPARATUS

The entire disclosure of Japanese patent Application No. 2017-182313, filed on Sep. 22, 2017, is incorporated herein by reference in its entirety.

BACKGROUND

Technological Field

The present invention relates to a print controller, an image forming system, and an image forming apparatus.

Description of the Related Art

In recent years, there has been a demand for higher-speed processing with an image forming part, to increase the print processing speed. There has also been a demand for higher-speed rasterization processing to convert print data written in a page description language into image data that can be printed by an electrophotographic image forming apparatus (this rasterization processing will be hereinafter referred to as raster image processor (RIP) processing). The RIP processing is normally performed by a print controller that transmits image data to an image forming apparatus.

Before starting printing, an image forming apparatus requires warm-up processing, such as temperature control for the fixing unit and a preliminary operation of the drive motor. The warm-up processing occurrence timing and the warm-up processing time also depend on the surrounding environments such as the temperature and the humidity around the image forming part. The print processing time relating to an image forming process (hereinafter also referred to as print processing) also varies depending on settings such as the type of the paper sheet on which the image forming apparatus is to form an image, and two-side printing or one-side printing. Furthermore, the print processing time also varies depending on the timing to transmit image data from the print controller to the image forming apparatus.

If the speed at which the print controller performs RIP processing on a particular page is slow, printing cannot be performed at the maximum print processing speed of the image forming apparatus, and the image forming apparatus is forced to have a standby time. If the standby time becomes equal to or longer than a certain period, the above described warm-up processing occurs.

In view of this, JP 2016-22697 A discloses a technique for preventing cycle-down by delaying the timing to transfer the raster page data of the next page stored in a storage unit after the raster page data of the previous page is transferred. "Cycle-down" is to suspend the engine unit and wait for a start of printing of the next page while in the suspended state in a case where printing of the next page cannot be started even after a predetermined period of time has passed since the end of the printing of the previous page.

Meanwhile, in conventional cases, an image forming apparatus performs warm-up processing, after the RIP processing by a print controller is completed and the image forming apparatus is enabled to perform printing. Therefore, the start of print processing by the image forming apparatus is delayed. As a result, the end time of the print processing is extended by an amount equivalent to the time required for the warm-up processing.

Further, if the warm-up processing cannot be performed at an appropriate timing, the warm-up processing by the image forming apparatus might be ended before the RIP processing by the print controller is completed. In such a case, to start the print processing immediately after the end of the RIP processing, it is necessary to maintain the state at the time when the warm-up processing by the image forming apparatus is ended. Therefore, the image forming apparatus unnecessarily consumes electric power.

Also, as in the technology disclosed in JP 2016-22697 A, if there is a long time between the transfer of the raster page data of the previous page and the transfer of the raster page data of the next page, an image forming apparatus still has to start warm-up processing. After the warm-up processing is completed, printing is started. Therefore, the end time of the print processing cannot be shortened.

SUMMARY

The present invention has been made in view of those circumstances, and an object thereof is to shorten the total print processing time from the start of rasterization processing to the end of printing.

To achieve the abovementioned object, according to an aspect of the present invention, a hardware processor reflecting one aspect of the present invention comprises: a communication part connected to the hardware processor; a rasterization processing time predictor that predicts a rasterization processing time required for rasterization processing for each page of input data; an output setting information extractor that extracts output setting information from print information about each page and transmits the output setting information to the hardware processor through the communication part, the output setting information relating to productivity of the hardware processor; a warm-up start time calculator that calculates a warm-up start time at which the hardware processor starts warm-up processing, to set an end time of the warm-up processing by the hardware processor at an earlier time than an end time of the rasterization processing time, in accordance with productivity information about the hardware processor, the productivity information being calculated by the hardware processor from the output setting information, the productivity information being received from the hardware processor through the communication part; a warm-up start notifier that notifies the hardware processor of a start of the warm-up processing through the communication part, when a current time reaches the warm-up start time; a rasterization processor that transmits image data to the hardware processor through the communication part, the image data being generated by performing the rasterization processing for each page; and a print start notifier that notifies the hardware processor of a print start after the warm-up processing is completed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. In this specification and the drawings, components having substantially the same functions or structures are denoted by the same reference numerals, and the same explanation is not repeated.

First Embodiment

First, an image forming system according to a first embodiment of the present invention is described.

Figure 1:
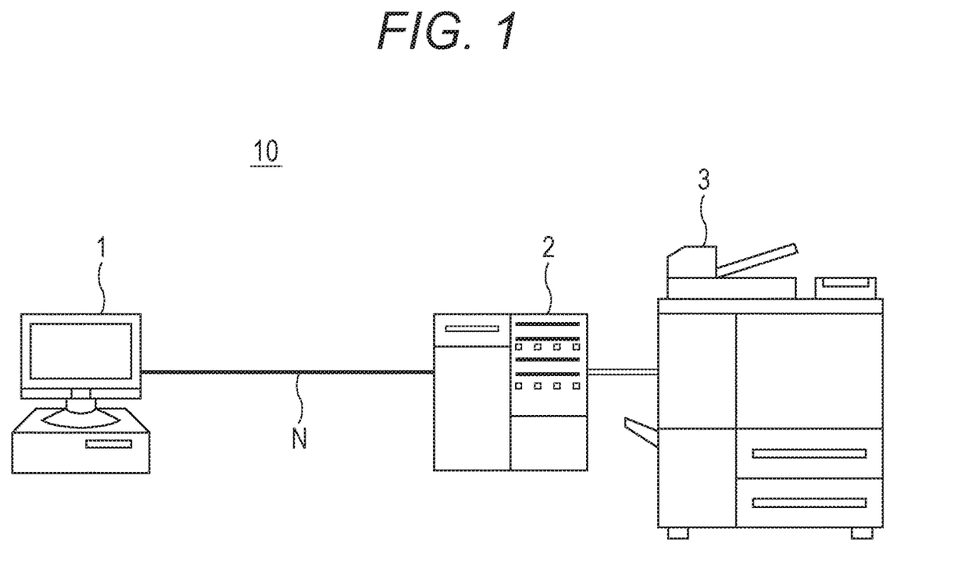
FIG. 1 is a schematic diagram showing an example overall configuration of an image forming system according to a first embodiment of the present invention.

FIG. 1 is a schematic diagram showing an example overall configuration of an image forming system 10.

<Overall Configuration of an Image Forming System>

The image forming system 10 shown in FIG. 1 includes a client terminal 1, a print controller 2, and an image forming apparatus 3. The client terminal 1 and the print controller 2 are connected to each other via a network N. The print controller 2 and the image forming apparatus 3 are also connected to each other in a wired manner.

A job that is input from the client terminal 1 is input to the print controller 2. For example, the job contains print data for the image forming apparatus 3 to form an image on a paper sheet. The job also contains print setting information such as how to allocate an image to paper sheets and how many copies of the image are to be made. The print controller 2 then not only transmits the image data for printing to the image forming apparatus 3, but also notifies the image forming apparatus 3 of the start of warm-up, the start of printing, and the like. Thus, the image forming apparatus 3 can shorten the total print processing time, and can perform warm-up processing and print processing at the optimum timing.

<Hardware Configurations of the Respective Devices>

Figure 2:
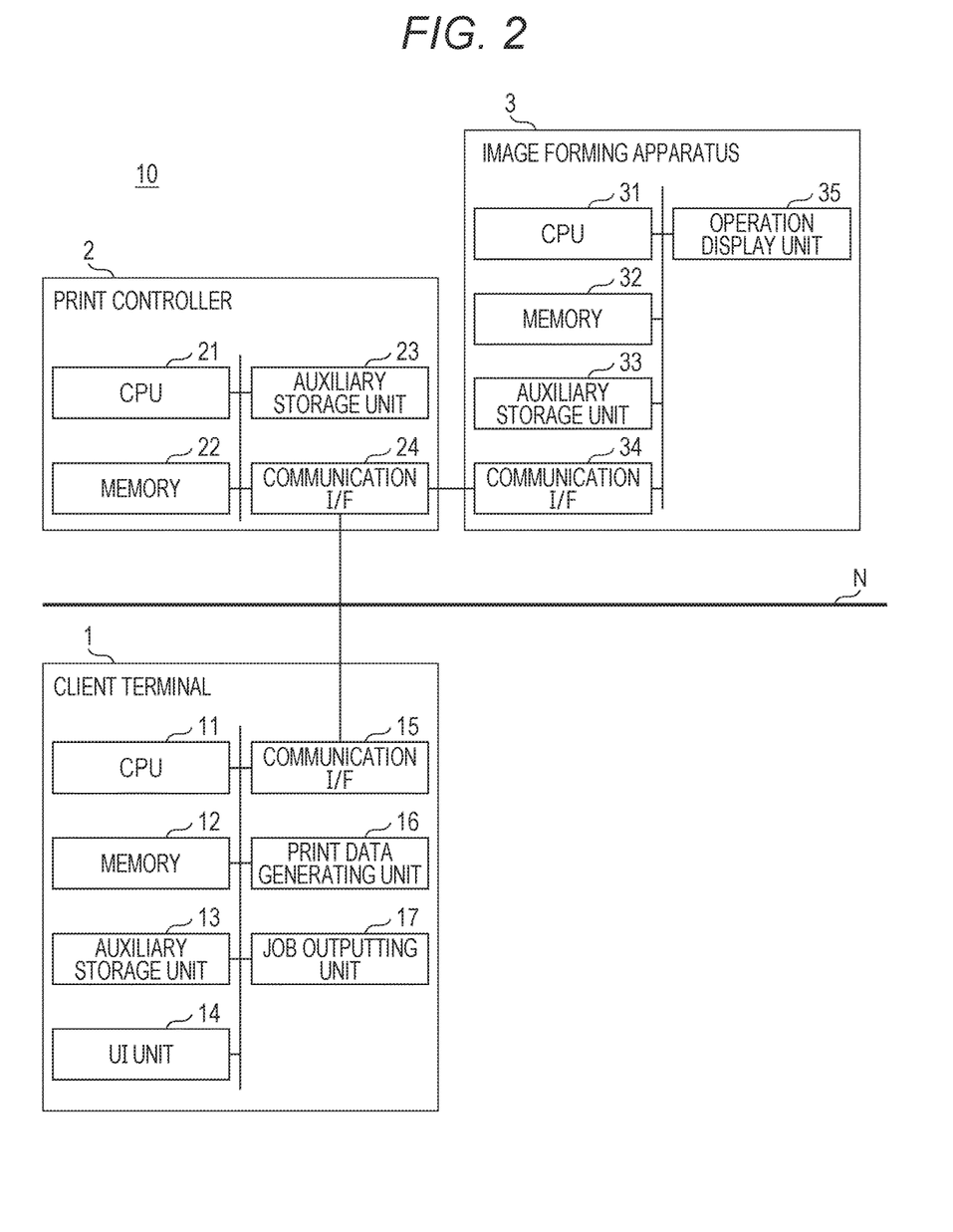
FIG. 2 is a block diagram showing an example hardware configuration of the respective devices included in the image forming system according to the first embodiment of the present invention.

FIG. 2 is a block diagram showing an example hardware configuration of the respective apparatuses included in the image forming system 10.

(Client Terminal)

The client terminal 1 includes a central processing unit (CPU) 11, a memory 12 that is a volatile recording medium, and an auxiliary storage unit 13 that is a nonvolatile recording medium. The CPU 11, the memory 12, and the auxiliary storage unit 13 are connected to one another via a bus. The client terminal 1 also includes a user interface unit 14 (shown as "UI unit" in FIG. 2), a communication interface (I/F) 15, a print data generating unit 16, and a job outputting unit 17. For example, a personal computer device is used as the client terminal 1.

The CPU 11 is a central processing unit that controls operations of the respective components of the client terminal 1. The CPU 11 reads the program codes of the software for achieving respective functions according to the first embodiment from the auxiliary storage unit 13, and executes the programs. It should be noted that the client terminal 1 may include a processing device such as a micro-processing unit (MPU), instead of the CPU 11.

The memory 12 is a main storage unit, and variables, parameters, and the like that are generated during arithmetic processing are temporarily written in the memory 12. A random access memory (RAM) or the like is used as the memory 12.

The auxiliary storage unit 13 is a storage unit that plays an auxiliary rote for the memory 12, and has a mechanism that can usually store data over a long period of time. A hard disk drive (FWD), a solid-state drive (SSD), a flexible disk, an optical disk, a magneto-optical disk, a CD-ROM, a CD-R, a magnetic tape, a nonvolatile memory card, or the like is used as the auxiliary storage unit 13. The auxiliary storage unit 13 stores a program for causing the client terminal 1 to function, as well as the operating system (OS) and various parameters. As described above, the auxiliary storage unit 13 is used as an example of a computer-readable non-transitory recording medium that stores various programs to be executed by the client terminal 1.

The user interface unit 14 is formed with a keyboard, a mouse, and the like through which the user can input an operation, and a liquid crystal display device or the like that allows the user to check the screen, for example. Through the user interface unit 14, the user can issue a job execution instruction, and check the results of the execution of the job.

The communication interface (I/F) 15 may be formed with a network interface card (NIC) or the like, for example, and is designed to be capable of exchanging various kinds of data with the respective devices via the network N, which is a local area network (LAN).

The print data generating unit 16 generates the print data of the image to be printed by the image forming system 10, using a document creation or image creation application, in accordance with an operation input by the user through the user interface unit 14.

The job outputting unit 17 generates a job containing the print setting information and the print data, and outputs the job to the print controller 2. The print setting information includes information such as page allocation.

(Controller)

The print controller 2 includes a CPU 21, a memory 22 that is a volatile recording medium, an auxiliary storage unit 23 that is a nonvolatile recording medium, and a communication I/F 24. The CPU 21, the memory 22, the auxiliary storage unit 23, and the communication I/F 24 are connected to one another via a bus. As described above, the print controller 2 transmits the image data generated by performing the RIP processing in accordance with the job received from the client terminal 1, to the image forming apparatus 3.

The CPU 21 is a central processing unit that controls operations of the respective components of the print controller 2. The CPU 21 reads the program codes of the software for achieving respective functions according to the first embodiment from the auxiliary storage unit 23, and executes the programs. It should be noted that the print controller 2 may include a processing device such as an MPU, instead of the CPU 21.

The memory 22 is a main storage unit, and variables, parameters, and the like that are generated during arithmetic processing are temporarily written in the memory 22. A RAM or the like is used as the memory 22.

The auxiliary storage unit 23 is a storage unit that plays an auxiliary rote for the memory 22, and has a mechanism that can usually store data over a long period of time. An HDD, an SSD, a flexible disk, an optical disk, a magneto-optical disk, a CD-ROM, a CD-R, a magnetic tape, a nonvolatile memory card, or the like is used as the auxiliary storage unit 23. The auxiliary storage unit 23 stores a program for causing the print controller 2 to function, as well as the OS and various parameters. In this manner, the auxiliary storage unit 23 is used as an example of a computer-readable non-transitory recording medium that stores various programs to be executed by the print controller 2.

The communication I/F 24 is formed with an NIC or the like, for example, and is designed to be capable of exchanging various kinds of data with the respective devices via the network N, which is a LAN or the like.

(Image Forming Apparatus)

Using the image data received from the print controller 2, the image forming apparatus 3 forms an image on a paper sheet in accordance with the print settings specified in the job, and outputs the image (this process will be hereinafter referred to as "print processing"). The image forming apparatus 3 may be a multifunction peripheral (MFP) having two or more kinds of functions (such as a print function, a copy function, and a scan function). The image forming apparatus 3 includes a CPU 31, a memory 32, an auxiliary storage unit 33, a communication 34, and an operation display unit 35.

The CPU 31 is a central processing unit that controls operations of the respective components of the image forming apparatus 3. The CPU 31 reads the program codes of the software for achieving respective functions according to the first embodiment from the auxiliary storage unit 33, and executes the programs. It should be noted that the image forming apparatus 3 may include a processing device such as an MPU, instead of the CPU 31.

The memory 32 is a main storage unit, and variables, parameters, and the like that are generated during arithmetic processing are temporarily written in the memory 32. A RAM or the like is used as the memory 32.

The auxiliary storage unit 33 is a storage unit that plays an auxiliary role for the memory 32, and has a mechanism that can usually store data over a long period of time. An HDD, an SSD, a flexible disk, an optical disk, a magneto-optical disk, a CD-ROM, a CD-R, a magnetic tape, a nonvolatile memory card, or the like is used as the auxiliary storage unit 33. The auxiliary storage unit 33 stores a program for causing the image forming apparatus 3 to function, as well as the OS and various parameters. In this manner, the auxiliary storage unit 33 is used as an example of a computer-readable non-transitory recording medium that stores various programs to be executed by the image forming apparatus 3.

The communication I/F 34 is formed with an NEC or the like, for example, and is designed to be capable of exchanging various kinds of data with the respective devices via the network N.

The operation display unit 35 is formed by stacking a touch screen that is an operating unit, on a flat panel display that is a display unit. The operation display unit 35 generates an operation signal corresponding to the content of the operation input from the user, and supplies the generated operation signal to the CPU 31. The operation display unit 35 also displays results of processing performed by the CPU 31.

Figure 3:
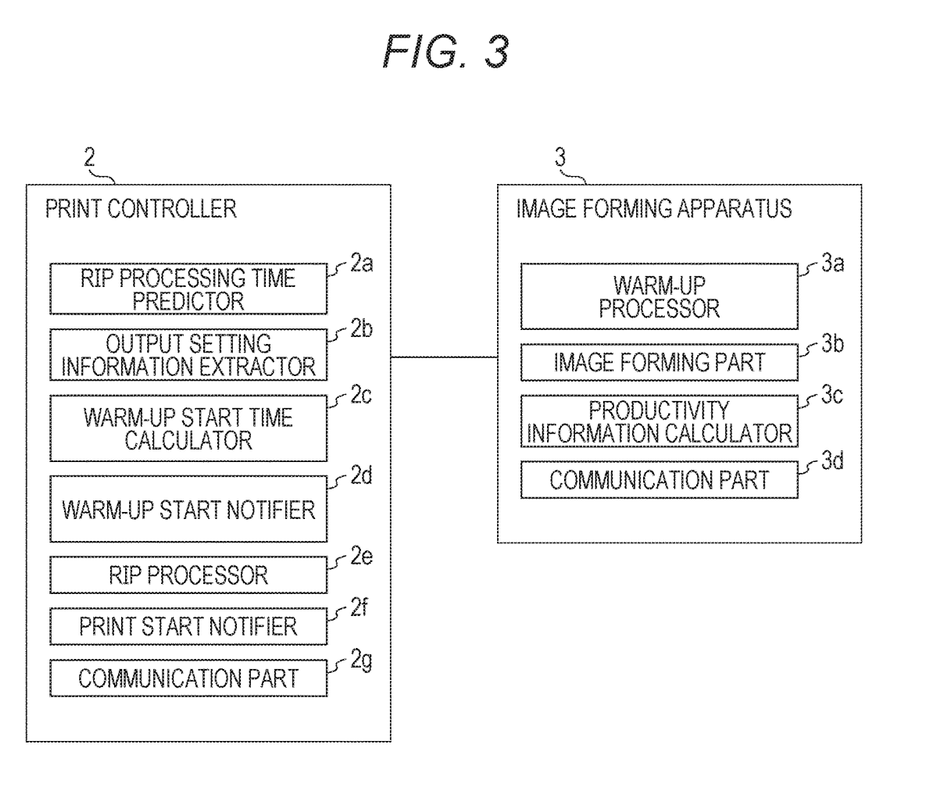
FIG. 3 is a functional block diagram showing example internal configurations of a print controller and an image forming apparatus according to the first embodiment of the present invention.

FIG. 3 is a functional block diagram showing example internal configurations of the print controller 2 and the image forming apparatus 3. In FIG. 3, any example internal configuration of the client terminal 1 is not shown.

(Controller)

The print controller 2 includes a RIP processing time predictor 2a, an output setting information extractor 2b, a warm-up start time calculator 2c, a warm-up start notifier 2d, a RIP processor 2e, a print start notifier 2f, and a communication part 2g.

The RIP processing time predictor 2a (an example of the rasterization processing time predictor) predicts the RIP processing time required for RIP processing, in accordance with the contents of the page description for each page of a job (an example of the input data) that has been transmitted from the client terminal 1 and been received by the communication part 2g. The predicted RIP processing time is expressed as the predicted RIP time in FIGS. 7 and 9, which will be described later.

The output setting information extractor 2b extracts the output setting information relating to the productivity of the image forming apparatus 3, from the print information about each page included in the job. The output setting information includes at least one of the following items: a type of paper sheet to be used, a type of post-processing, a predicted amount of toner to be used, a paper sheet size, a basis weight, and post-processing settings, for example. The output setting information is used for the image forming apparatus 3 to calculate productivity information. Therefore, the output setting information extractor 2b transmits the output setting information to the image forming apparatus 3 through the communication part 2g.

In a case where the output setting information about the page included in the currently received job differs from the output setting information about the previous page included in the previously received job, the output setting information extractor 2b transmits the output setting information included in the currently received job to the image forming apparatus 3 through the communication part 2g. The previous page is the page previously output by the image forming apparatus 3, and is the last page of the previous job. In a case where the output setting information about the page included in the currently received job is the same as the output setting information about the previous page included in the previously received job, the output setting information included in the currently received job is not transmitted.

The warm-up start time calculator 2c calculates a warm-up start time at which the image forming apparatus 3 starts warming up. The warm-up start time is calculated in accordance with the productivity information about the image forming apparatus 3 so that the end time of the warm-up processing by the image forming apparatus 3 comes earlier than the end time of the RIP processing time. When calculating the warm-up start time, the warm-up start time calculator 2c takes into consideration the temperature and the humidity around an image forming part 3b provided in the image forming apparatus 3, and the power consumption settings of the image forming apparatus 3.

Here, the productivity information about the image forming apparatus 3 is information received from the image forming apparatus 3 through the communication part 2g. The productivity information includes a print processing time calculated for each page, a predicted warm-up occurrence time indicating a predicted time of an occurrence of warm-up processing, and a predicted warm-up processing time required for the warm-up processing. The print processing time is the time required for the print process for each page. The predicted warm-up occurrence time is a predicted time to pass until warm-up processing becomes necessary when page printing is resumed, in a case where the image forming apparatus 3 enters a standby state after the print processing for the previous page is finished, and the temperature and the humidity around the image forming part 3b have changed. The predicted warm-up processing time is a predicted time required for warm-up processing.

The warm-up start time calculator 2c then calculates the warm-up start time in accordance with the predicted warm-up processing time earlier than the end time of the RIP processing time. Since the warm-up processing is performed in parallel with the RIP processing before the end time of the RIP processing time, the standby time of the image forming apparatus 3 after the print processing for the previous page is completed is minimized.

When the current time reaches the warm-up start time, the warm-up start notifier 2d instructs the image forming apparatus 3 to start the warm-up processing, through the communication part 2g. The current time is a time that is managed by the print controller 2.

The RIP processor 2c (an example of the rasterization processor) performs RIP processing for converting print data that reflects print settings in accordance with the print setting information in the job into a language (a page description language: PDL) that can be recognized by the image forming apparatus 3. Other than the PDL, the image forming apparatus 3 can recognize PCL, PostScript, and the like. This RIP processing is performed for each page included in the job. The RIP processor 2e then generates image data from the print data by performing the RIP processing. The RIP processor 2e transmits the image data generated by performing the RIP processing for each page, to the image forming apparatus 3 through the communication part 2g.

After the warm-up processing is completed, the print start notifier 2f notifies the image forming apparatus 3 of a print start. The print start notification is performed at the time when the warm-up processing by the image forming apparatus 3 is completed, in accordance with the end time of the warm-up processing by the image forming apparatus 3, the end time having been calculated by the warm-up start time calculator 2c.

The communication part 2g (an example of the first communication part) is connected to the image forming apparatus 3, receives the job from the client terminal 1, and outputs the job to the RIP processing time predictor 2a. The communication part 2g also transmits the output setting information relating to the productivity of the image forming apparatus 3 to the image forming apparatus 3, the output setting information having been extracted from the job by the output setting information extractor 2b. The communication part 2g further receives the productivity information calculated by the image forming apparatus 3.

(Image Forming Apparatus)

The image forming apparatus 3 includes a warm-up processor 3a, the image forming part 3b, a productivity information calculator 3c, and a communication part 3d.

The warm-up processor 3a starts warm-up processing in accordance with a notification of the start of warm-up processing, having received the notification from the print controller 2 through the communication part 3d.

The image forming part 3b forms an image on a paper sheet, in accordance with the image data transmitted from the print controller 2. The timing at which the image forming part 3b forms an image is the timing at which a print start is notified from the print controller 2 through the communication part 3d after the warm-up processing is completed.

The productivity information calculator 3c calculates productivity information based on the output setting information received from the print controller 2 through the communication part 3d, and transmits the productivity information to the print controller 2 through the communication part 3d.

The communication part 3d (an example of the second communication part) receives the output setting information transmitted from the print controller 2, and outputs the output setting information to the productivity information calculator 3c. The communication part 3d also transmits the productivity information calculated by the productivity information calculator 3c to the print controller 2. The communication part 3d also receives the image data transmitted from the print controller 2.

Figure 4:
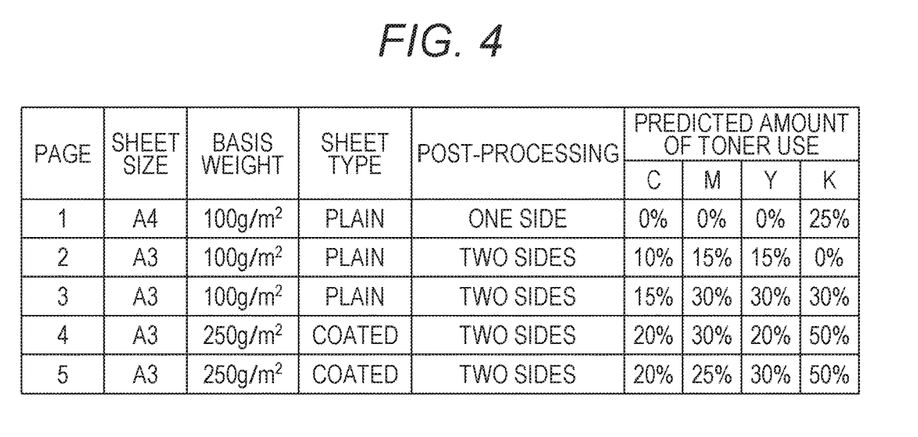
FIG. 4 is an explanatory diagram showing an example of output setting information relating to productivity according to the first embodiment of the present invention.

FIG. 4 is an explanatory diagram showing an example of the output setting information. The output setting information includes the following items: page, sheet size, basis weight, sheet type, post-processing, predicted toner usage amount.

The page column stores page numbers. However, the page column may store page numbers having the same output setting information.

The sheet size column stores the sheet sizes of the paper sheets on which the image is to be formed by the image forming apparatus 3.

The basis weight column stores the basis weights of the paper sheets.

The sheet type column stores sheet types such as plain paper and coated paper, for example.

The post-processing column stores the contents of post-processing indicating either one-side printing or two-side printing.

The predicted toner usage amount column stores predicted toner usage amounts indicating the predicted amounts of usage of the toner to be used in forming the image on the paper sheets. For example, a predicted toner usage amount is stored for each of the C, M, Y, and K toners.

Note that the output setting information may include the print speed of the image forming apparatus 3, as well as the above described information.

Figure 5:
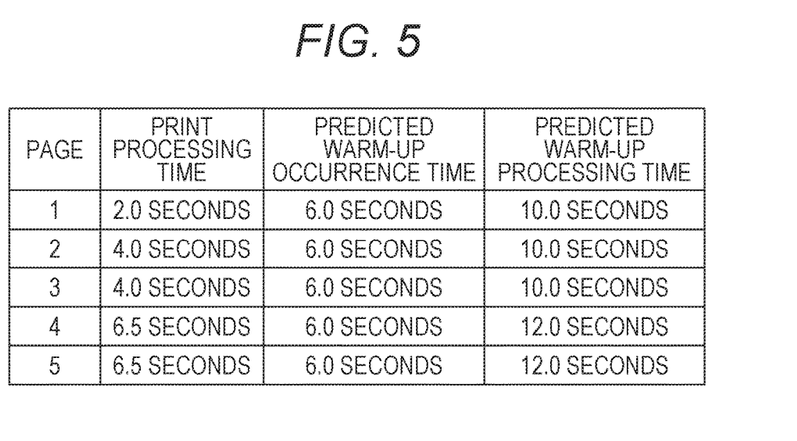
FIG. 5 is an explanatory diagram showing an example of productivity information according to the first embodiment of the present invention.

FIG. 5 is an explanatory diagram showing an example of the productivity information. The productivity information includes the following items: page, print processing time, predicted warm-up occurrence time, and predicted warm-up processing time.

The print processing time column stores the print processing time required for each page.

The predicted warm-up occurrence time column stores the predicted warm-up occurrence time that is a certain time in which warm-up processing is again needed after a the print processing by the image forming apparatus 3 is completed. In a case where the standby time exceeds the predicted warm-up occurrence time after the image forming apparatus 3 finishes the print processing, warm-up processing is again performed.

The predicted warm-up processing time column stores the predicted warm-up processing time required for the warm-up processor 3a to perform warm-up processing for each page.

Next, the differences between conventional warm-up processing and the warm-up processing according to the first embodiment are described, with reference to FIGS. 6 through 9.

Figure 6:
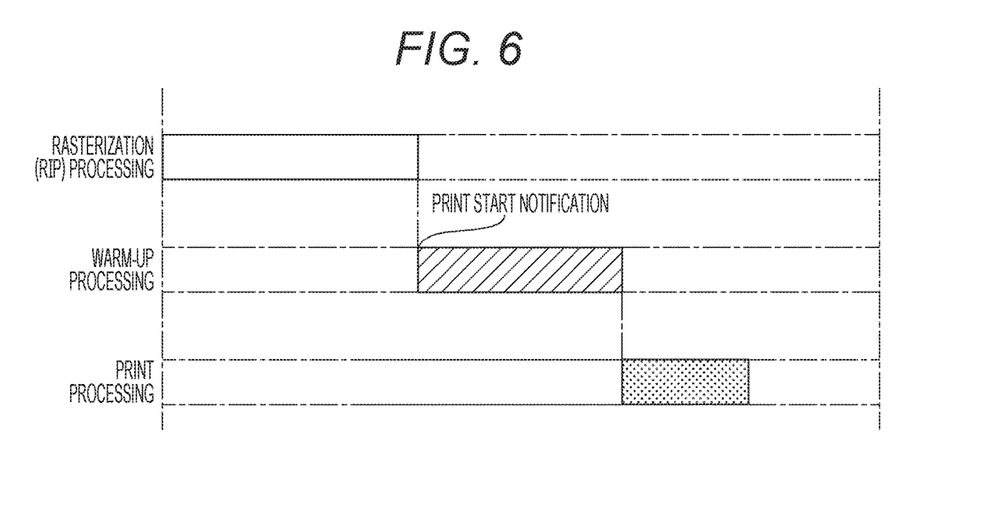
FIG. 6 is a timing chart showing a conventional example of RIP processing, warm-up processing, and print processing on a job-by-job basis.
Figure 7:
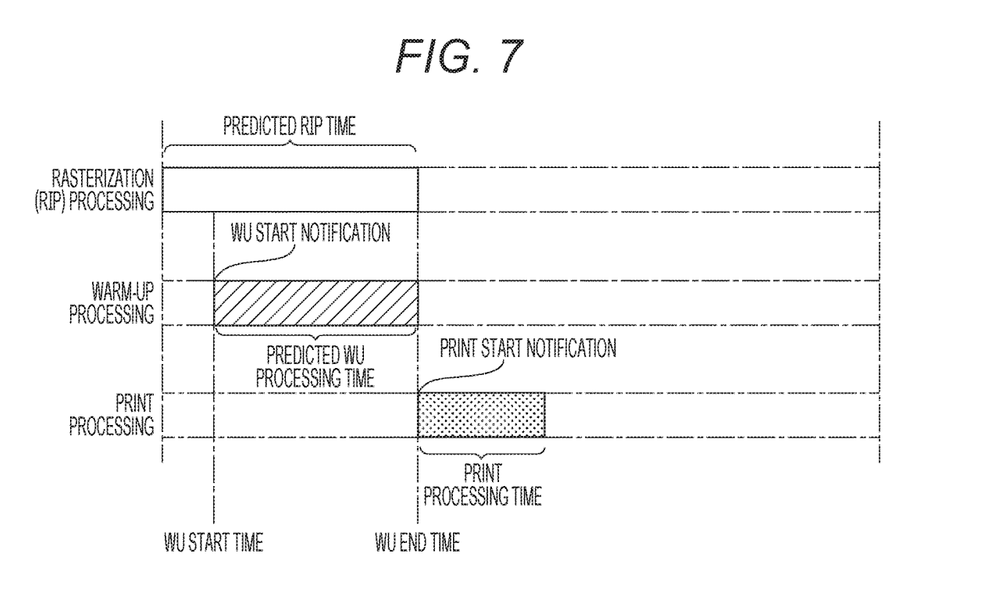
FIG. 7 is a timing chart showing an example of RIP processing, warm-up processing, and print processing on a job-by-job basis according to the first embodiment of the present invention.

Referring first to FIGS. 6 and 7, warm-up processing on a job-by-job basis is described.

FIG. 6 is a timing chart showing a conventional example of RIP processing, warm-up processing, and print processing on a job-by-job basis.

In a conventional image forming system, after RIP processing is performed on a job-by-job basis by a print controller, an image forming apparatus is notified of a print start by the print controller. The image forming apparatus notified of the print start starts warm-up processing. After performing sufficient warm-up processing, the image forming apparatus starts print processing based on image data received from the print controller.

As described above, in a conventional case, warm-up processing is performed after RIP processing is completed, and print processing is performed after the warm-up processing is completed. In other words, even if the conventional image forming apparatus receives a print start notification from the print controller, the image forming apparatus cannot start the print processing before the end of the warm-up processing.

FIG. 7 is a timing chart showing an example of RIP processing, warm-up processing, and print processing on a job-by-job basis according to the first embodiment. In the drawing, "warm-up" is also written as "WU".

The warm-up processor 3a of the image forming apparatus 3 according to the first embodiment starts the warm-up processing early so that the end time of the RIP processing by the print controller 2 coincides with the end time of the warm-up processing. Because of this, it is necessary for the RIP processing time predictor 2a to predict the RIP processing time, and for the warm-up start time calculator 2c to calculate the warm-up start time.

Therefore, the RIP processing time predictor 2a calculates a predicted RIP time required for the RIP processor 2e to perform the RIP processing. The warm-up start time calculator 2c then calculates a predicted warm-up processing time, in accordance with productivity information received from the image forming apparatus 3. In accordance with the predicted warm-up processing time, the warm-up start time calculator 2c calculates the warm-up start time so that the end time of the warm-up processing comes earlier than the end time of the rasterization processing time.

When the current time reaches the warm-up start time, the warm-up start notifier 2d notifies the image forming apparatus 3 of the warm-up start, and a warm-up is started in the image forming apparatus 3. After that, at the time when the warm-up processing is completed, the print start notifier 2f notifies the image forming apparatus 3 of the print start. In the image forming apparatus 3 notified of the print start, the printing is started, and, after a predetermined print processing time has passed, the printing is ended.

In this manner, in the image forming apparatus 3, the warm-up processing is started before the RIP processing by the print controller 2 is completed. Accordingly, the start of the print processing can be set immediately after the end of the RIP processing. As a result, the total processing time in the image forming system 10 can be made much shorter than the total processing time in the conventional image forming system.

Figure 8:
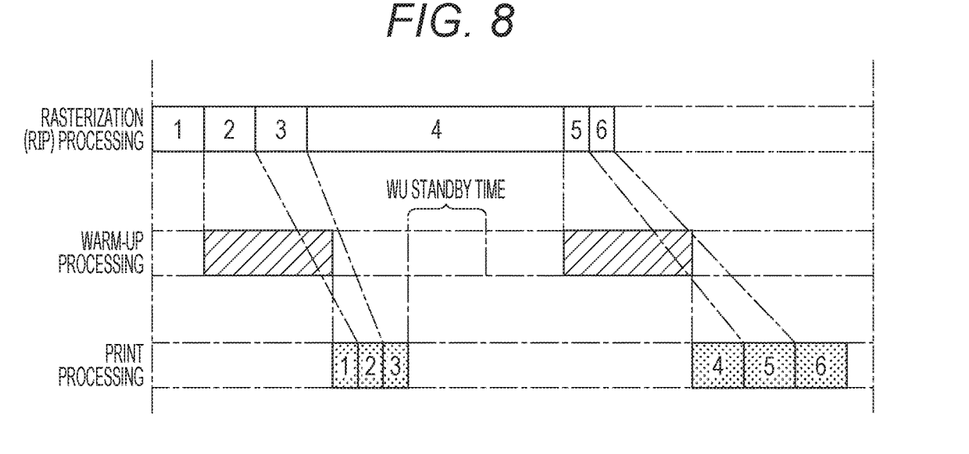
FIG. 8 is a timing chart showing a conventional example of RIP processing, warm-up processing, and print processing on a page-by-page basis.
Figure 9:
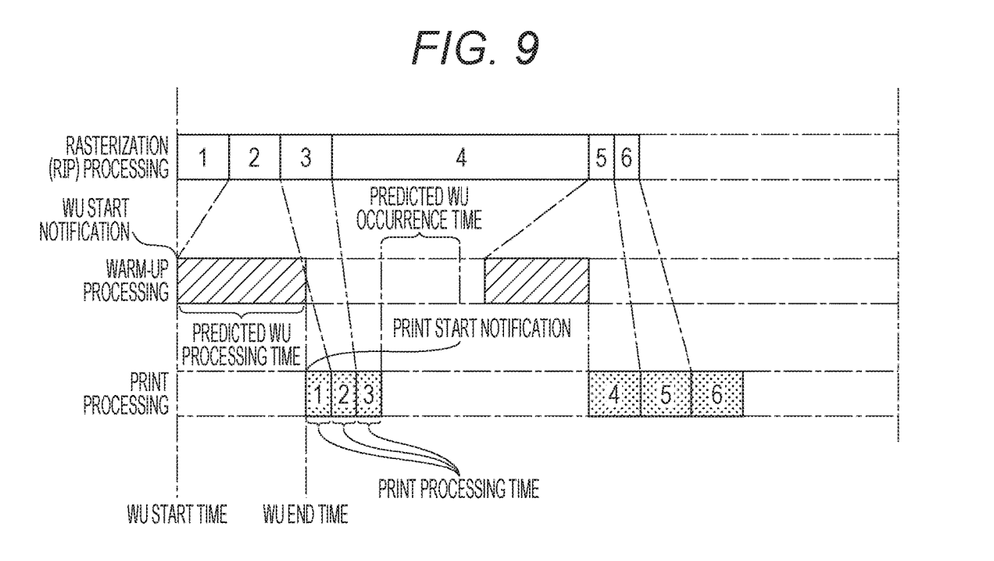
FIG. 9 is a timing chart showing an example of RIP processing, warm-up processing, and print processing on a page-by-page basis according to the first embodiment of the present invention.

Referring now to FIG. 8 and FIG. 9, warm-up processing on a page-by-page basis is described.

FIG. 8 is a timing chart showing a conventional example of RIP processing, warm-up processing, and print processing on a page-by-page basis.

In a conventional image forming system, warm-up processing by the image forming apparatus 3 is started after the RIP processing for the first page by the print controller is completed, and print processing is started after the warm-up processing is completed. Since print processing for the second page and the third page can be started without any warm-up processing, the print processing for the second page and the third page is performed immediately after the print processing for the first page.

The fourth page requires a longer RIP processing time than each of the first through third pages. Therefore, after the image forming apparatus completes the printing of the third page, the image forming apparatus temporarily enters a standby state. When a certain period of time (a predicted warm-up occurrence time) has passed while the image forming apparatus remains in the standby state, the temperature of the fixing unit in the image forming apparatus changes, for example. Therefore, warm-up processing needs to be performed again in the image forming apparatus. Therefore, after the RIP processing for the fourth page by the print controller is completed, warm-up processing is performed again in the image forming apparatus. After the warm-up processing is completed, the print processing for the fourth and the subsequent pages is performed.

FIG. 9 is a timing chart showing an example of RIP processing, warm-up processing, and print processing on a page-by-page basis according to the first embodiment.

In the image forming system 10 according to the first embodiment, the image forming apparatus 3 cannot finish the warm-up processing before the predicted RIP processing end time for the first page. Therefore, the image forming apparatus 3 starts the warm-up processing at the same time as the start of the RIP processing by the print controller 2. Because of this, the image forming apparatus 3 can minimize the standby time due to the warm-up processing before the start of the print processing. As soon as the warm-up processing is completed, the print processing for the first page is started. Accordingly, the image forming apparatus 3 can shorten the time before the print end time of the first page as compared with the conventional image forming apparatus. Thus, the user can obtain printed matter faster than in conventional cases.

For the second and third pages as well, processing is performed in the same manner as for the first page. The rasterization processing requires almost the same time among the first through third pages. Immediately after completing the print processing for the previous page, the image forming apparatus 3 can start the printing of the second page and the third page.

As for the processing for the fourth and the subsequent pages, the image forming apparatus 3 also determines whether to perform warm-up processing in accordance with the print end times of the first three pages, the predicted RIP processing time of the fourth page, and the predicted warm-up occurrence time. If it is determined that warm-up processing needs to be performed, the warm-up start time calculator 2*c* calculates the start time of the warm-up processing.

As a result, the warm-up processing by the image forming apparatus 3 can be performed in advance while the RIP processing for the fourth page is being performed, as in the processing for the first page. Accordingly, the end time of the RIP processing for the fourth page coincides with the end time of the warm-up processing. After that, the image forming apparatus 3 performs the print processing for the fourth through sixth pages in the same manner as the print processing for the first through third pages. Thus, the image forming apparatus 3 can shorten the time required until the print processing for the fourth and the subsequent pages is completed, as compared with the conventional image forming apparatus.

Figure 10:
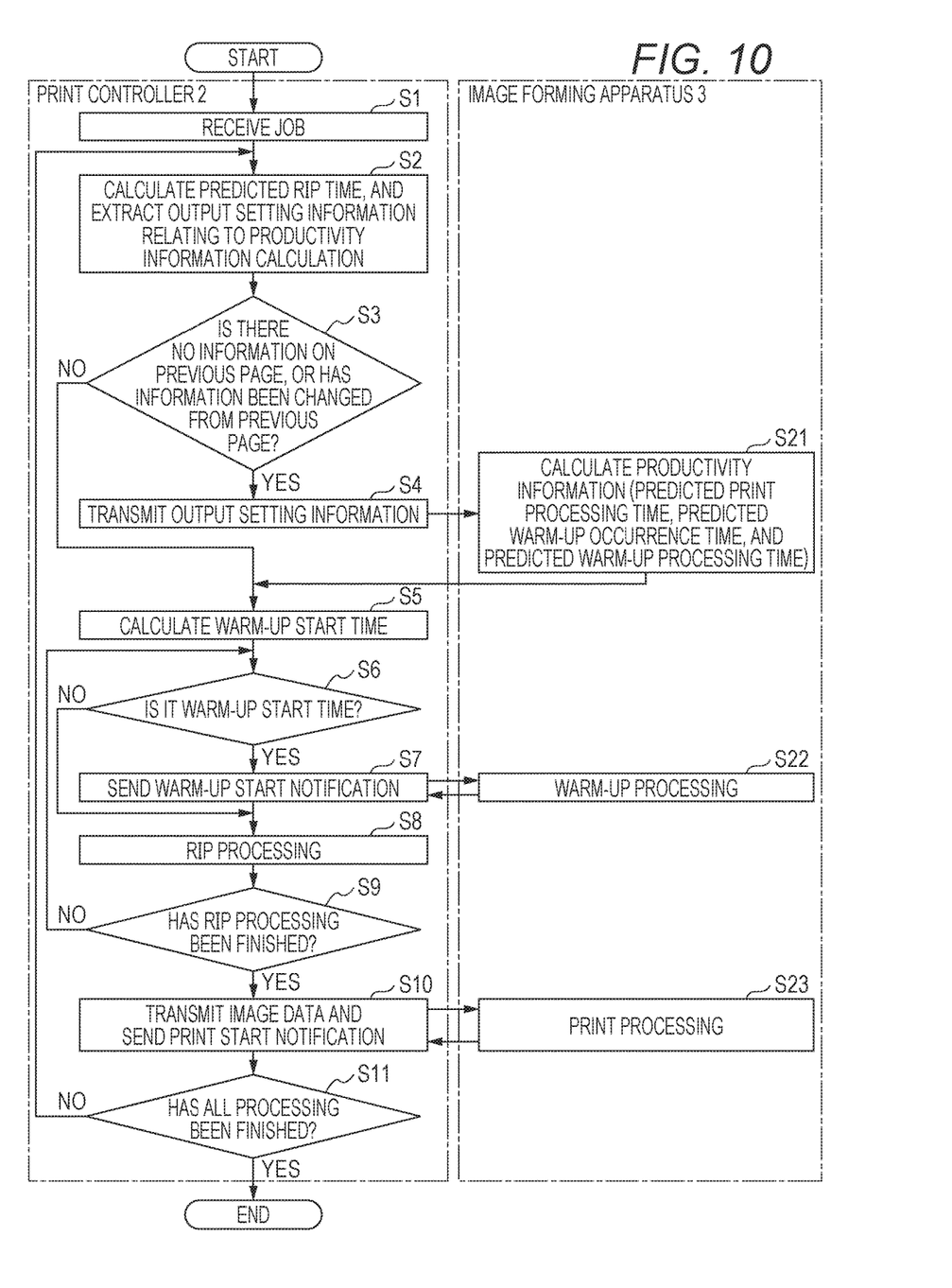
FIG. 10 is a flowchart showing an example of cooperative processing between the print controller and the image forming apparatus according to the first embodiment of the present invention.

FIG. 10 is a flowchart showing an example of cooperative processing between the print controller 2 and the image forming apparatus 3.

First, the communication part 2*g* of the print controller 2 receives a job transmitted from the client terminal 1 (S1). The output setting information extractor 2*b* then calculates a predicted RIP time for each page from the job, and extracts the output setting information (about paper sheets, post-processing, predicted toner usage amounts, and the like) relating to the calculation of the productivity information (S2).

The output setting information extractor 2*b* then determines whether there is no previous page information, or whether the output setting information about the current page has changed from the output setting information about the previous page (S3). If there is no previous page information, or if the output setting information about the current page has changed from the output setting information about the previous page (YES in S3), the communication part 2*g* transmits the output setting information about the current page to the image forming apparatus 3 (S4).

When the communication part 3*d* of the image forming apparatus 3 receives the output setting information relating to the calculation of the productivity information from the print controller 2, the productivity information calculator 3*c* calculates the productivity information (S21). The productivity information includes a predicted print processing time, a predicted warm-up occurrence time, and a predicted warm-up processing time. The communication part 3*d* then transmits the productivity information to the image forming apparatus 3.

If it is determined in step S3 that the output setting information about the current page has not changed from the output setting information about the previous page (NO in S3), or if the communication part 2*g* receives the productivity information transmitted from the image forming apparatus 3 in step S21, the warm-up start time calculator 2*c* calculates the warm-up start time (S5). The warm-up start time is calculated in accordance with the productivity information received from the image forming apparatus 3 and the predicted RIP time calculated in step S2.

In a case where there is a need to perform warm-up processing, the warm-up processing is started at the warm-up start time. Therefore, the warm-up start notifier 2*d* determines whether the current time has reached the warm-up start time (S6). If the current time has reached the warm-up start time (YES in S6), the warm-up start notifier 2*d* notifies the image forming apparatus 3 of the warm-up start (S7).

If the current time has not reached the warm-up start time (NO in S6), the process moves on to step S8. A case where the current time has not reached the warm-up start time is a case where the warm-up processing has already been performed, and any warm-up start time has not been calculated.

The warm-up processor 3*a* of the image forming apparatus 3 starts warming up in accordance with the warm-up start notification (S22). The image forming apparatus 3 then notifies the print controller 2 that the warm-up processing is being performed. Thus, the print controller 2 recognizes that the warm-up processing is being performed in the image forming apparatus 3.

If the current time has not reached the warm-up start time (NO in S6), or after the warm-up processing is started in step S22, the RIP processor 2*e* performs RIP processing in accordance with the job (S8). The RIP processing in the print controller 2 is performed in parallel with the warm-up processing in the image forming apparatus 3. The RIP processing is performed in substantially the same RIP processing time as the RIP processing time predicted by the RIP processing time predictor 2*a*.

The RIP processor 2*e* then determines whether the RIP processing has been completed (S9). If the RIP processing by the RIP processor 2*e* has not been completed (NO in S9), the process returns to step S6, in which a check is made to determine whether the warm-up start time has come, and the subsequent processing is performed.

If the RIP processing by the RIP processor 2*e* has been completed (YES in S9), on the other hand, the image data is transmitted from the communication part 2*g* to the image forming apparatus 3, and the print start notifier 2*f* notifies the image forming apparatus 3 of the print start (S10).

Having received the image data from the print controller 2 and been notified of the print start, the image forming apparatus 3 starts image formation with the image forming part 3*b*, or starts print processing (S23). When the print processing is completed, the image forming apparatus 3 notifies the print controller 2 of the end of the print processing.

The print controller 2 then determines whether the processing for all the pages included in the job received from the client terminal 1 (this processing is referred to as the "overall processing") has been completed (S11). When the overall processing has not been completed, or if there is an unprocessed page in the job (NO in S11), the process returns to step S2, and a check is made to determine whether the warm-up start time has come. If the overall processing has been completed, or if there is no unprocessed page in the job (YES in S11), on the other hand, the cooperative processing comes to an end.

In the image forming system 10 according to the first embodiment described above, the image forming apparatus 3 starts warm-up processing at the optimum timing before the start of printing. The print controller 2 then transmits the output setting information to the image forming apparatus 3, and thus, the print processing time based on the output setting information, and the predicted time relating to the warm-up processing are obtained. The start time of the warm-up processing time is then calculated, as well as the predicted RIP time of each image. As a result, the image forming apparatus 3 achieves efficient print performance and power consumption by performing the warm-up processing at an appropriate timing (appropriate for minimizing the standby time from the RIP end to the print start) before the start of printing.

Further, the image forming apparatus 3 can start print processing in the order of pages on which the RIP processing has been performed. Accordingly, it becomes possible to eject the printed pages before the RIP processing for all the pages is completed. Thus, it becomes possible to satisfy the users' demand for the fastest possible acquisition of printed matter.

Second Embodiment

Next, an image forming system according to a second embodiment of the present invention is described. In the image forming system according to the second embodiment, an image forming apparatus has the functions of the print controller 2 of the first embodiment.

Figure 11:
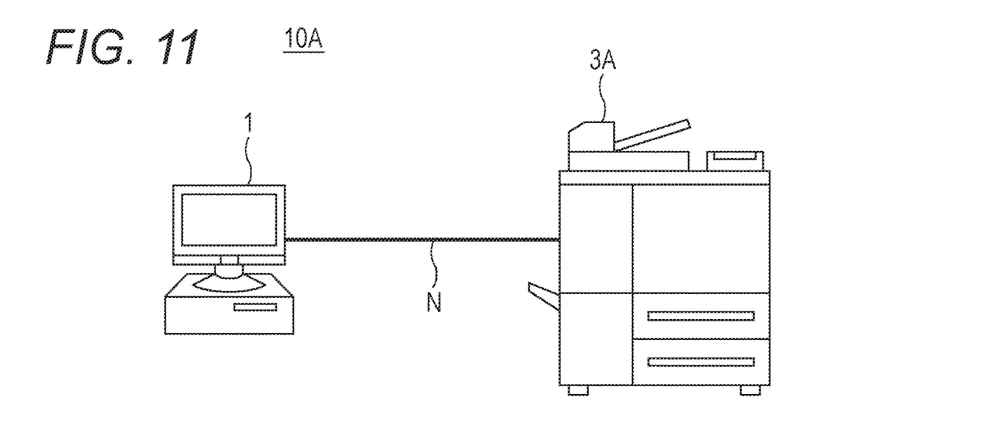
FIG. 11 is a schematic diagram showing an example overall configuration of an image forming system according to a second embodiment of the present invention.

FIG. 11 is a schematic diagram showing an example overall configuration of an image forming system 10A.

<Overall Configuration of an Image Forming System>

The image forming system 10A includes a client terminal 1 and an image forming apparatus 3A. The client terminal 1 and the image forming apparatus 3A are connected via a network N. A job that is input from the client terminal 1 is input directly to the image forming apparatus 3A. The image forming apparatus 3A can start printing at an optimum timing, after creating the image data for the printing by performing RIP processing and the like in accordance with the job.

Figure 12:
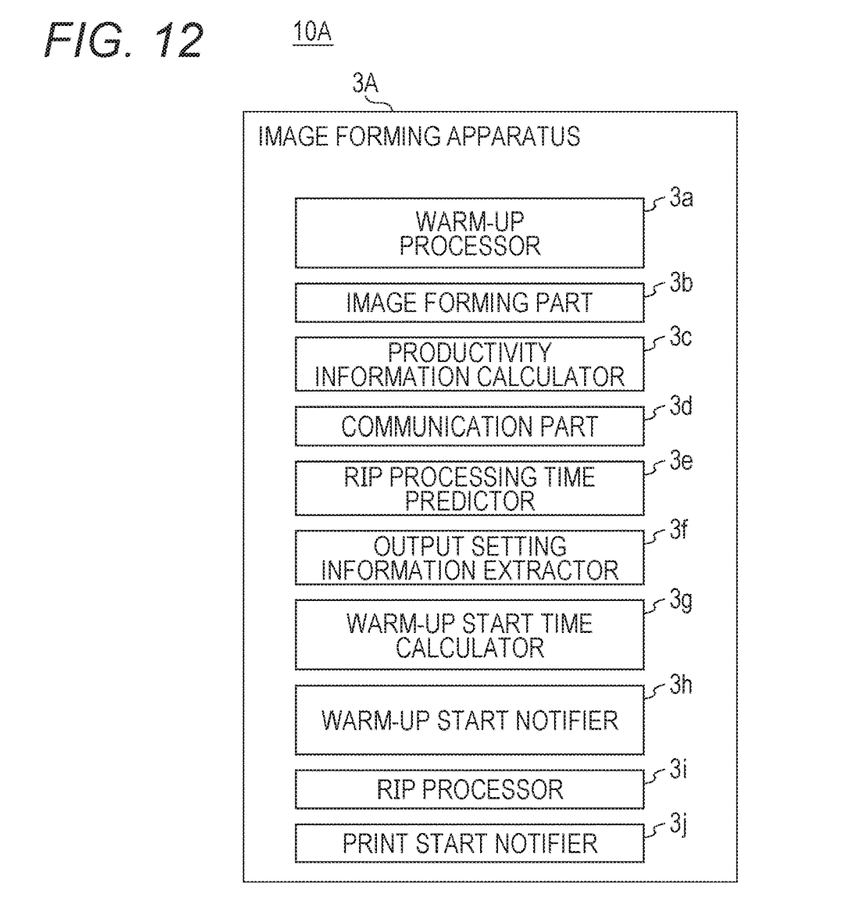
FIG. 12 is a functional block diagram showing an example internal configuration of an image forming apparatus according to the second embodiment of the present invention.

FIG. 12 is a functional block diagram showing an example internal configuration of the image forming apparatus 3A. In FIG. 12, any example internal configuration of the client terminal 1 is not shown.

The image forming apparatus 3A includes a warm-up processor 3a, an image forming part 3b, a productivity information calculator 3c, and a communication part 3d that are the same as those of the image forming apparatus 3 according to the first embodiment. The image forming apparatus 3A further includes a RIP processing time predictor 3e, an output setting information extractor 3f, a warm-up start time calculator 3g, a warm-up start notifier 3h, a RIP processor 3i, and a print start notifier 3j.

The communication part 3d receives a job from the client terminal 1.

The RIP processing time predictor 3e predicts a RIP processing time required for RIP processing for each page included in the job.

The output setting information extractor 3f extracts output setting information relating to the productivity of the image forming apparatus 3A, from print information about each page.

In accordance with productivity information about the image forming apparatus 3A calculated from the output setting information, the warm-up start time calculator 3g calculates the warm-up start time at which a warm-up is started so that the end time of the warm-up processing comes earlier than the end time of the RIP processing time.

The warm-up start notifier 3h issues a notification of the start of warm-up processing when the current time reaches the warm-up start time.

In accordance with the notification of the start of warm-up processing, the warm-up processor 3a starts the warm-up processing.

The RIP processor 3i performs RIP processing for each page, and generates image data from print data.

After the warm-up processing is completed, the print start notifier 3j issues a notification of a print start.

The image forming part 3b then forms an image on a paper sheet at the time when the notification of a print start arrives.

In the image forming system 10A according to the second embodiment described above, the image forming apparatus 3A has the functions of the print controller 2 of the first embodiment. Accordingly, the image forming apparatus 3A does not need to take time to exchange data with the print controller 2. As a result, warm-up processing can be started as soon as a notification of a warm-up start is issued. Further, print processing can be performed as soon as a notification of a print start is issued.

Although embodiments of the present invention have been described and illustrated in detail, the disclosed embodiments are made for purposes of illustration and example only and not limitation. The scope of the present invention should be interpreted by terms of the appended claims. Various other applications and modifications can of course be made to them without departing from the scope of the present invention as set forth in the claims.

For example, for easier understanding of the present invention, the configurations of devices and systems have been specifically and explicitly described in the above embodiments. However, not all the components described above should be included in an apparatus or a system. It is also possible to replace some of the components of the embodiments described herein with components of some other embodiment, and furthermore, it is possible to add components of some other embodiment to the components of one of the embodiments described above. It is also possible to add, delete, or replace some of the components of each of the above embodiments to/from/with other components.

Further, the control lines and the information lines shown in the drawings are ones necessary for the explanation, but not all the control lines and all the information lines in the products are shown. In practice, it can be considered that almost all the components are connected to one another.

What is claimed is:

1. A hardware processor comprising:
a communication part connected to the hardware processor;
a rasterization processing time predictor that predicts a rasterization processing time required for rasterization processing for each page of input data;
an output setting information extractor that extracts output setting information from print information about each page and transmits the output setting information to the hardware processor through the communication part, the output setting information relating to productivity of the hardware processor;
a warm-up start time calculator that calculates a warm-up start time at which the hardware processor starts warm-up processing, to set an end time of the warm-up processing by the hardware processor at an earlier time than an end time of the rasterization processing time, in accordance with productivity information about the hardware processor, the productivity information being calculated by the hardware processor from the output setting information, the productivity information being received from the hardware processor through the communication part;

a warm-up start notifier that notifies the hardware processor of a start of the warm-up processing through the communication part, when a current time reaches the warm-up start time;

a rasterization processor that transmits image data to the hardware processor through the communication part, the image data being generated by performing the rasterization processing for each page; and a print start notifier that notifies the hardware processor of a print start after the warm-up processing is completed.

2. The hardware processor according to claim 1, wherein the productivity information about the hardware processor includes a print processing time calculated for each page, a predicted warm-up occurrence time indicating a predicted occurrence of the warm-up processing, and a predicted warm-up processing time required for the warm-up processing, and the warm-up start time calculator calculates the warm-up start time in accordance with the predicted warm-up processing time earlier than the end time of the rasterization processing time.

3. The hardware processor according to claim 2, wherein the rasterization processing time predictor predicts the rasterization processing time at a time when the communication part receives a job as the input data from the hardware processor, the rasterization processing time being predicted in accordance with contents written on each page included in the job.

4. The hardware processor according to claim 1, wherein the warm-up start time calculator calculates the warm-up start time to minimize a standby time from the end time of the rasterization processing time to a time at which image formation is started in the hardware processor.

5. The hardware processor according to claim 1, wherein, when the output setting information about a page included in a job currently received differs from the output setting information about a previous page included in a job previously received, the output setting information extractor transmits the output setting information about the page included in the currently received job to the hardware processor through the communication part.

6. The hardware processor according to claim 5, wherein the previous page is a page previously output from the hardware processor, and is the last page in the job previously received.

7. The hardware processor according to claim 1, wherein the output setting information includes at least one of a paper sheet to be used, a type of post-processing, a predicted toner usage amount, a sheet size, a basis weight, and a post-processing setting.

8. The hardware processor according to claim 1, wherein the warm-up start time calculator calculates the warm-up start time, in accordance with a temperature and a humidity around an image forming part, and a power consumption setting of the hardware processor, the hardware processor forming an image on a paper sheet with the image forming part.

9. An image forming system comprising
a hardware processor,
wherein
the hardware processor includes:
a first communication part connected to the hardware processor;
rasterization processing time predictor that predicts a rasterization processing time required for rasterization processing for each page of input data;

an output setting information extractor that extracts output setting information from print information about each page and transmits the output setting information to the hardware processor through the first communication part, the output setting information relating to productivity of the hardware processor;

a warm-up start time calculator that calculates a warm-up start time at which the hardware processor starts warm-up processing, to set an end time of the warm-up processing by the hardware processor at an earlier time than an end time of the rasterization processing time, in accordance with productivity information about the hardware processor, the productivity information being calculated by the hardware processor from the output setting information, the productivity information being received from the hardware processor through the first communication part;

a warm-up start notifier that notifies the hardware processor of a start of the warm-up processing through the first communication part, when a current time reaches the warm-up start time;

a rasterization processor that transmits image data to the hardware processor through the first communication part, the image data being generated by performing the rasterization processing for each page; and a print start notifier that notifies the hardware processor of a print start, and the hardware processor includes:
a second communication part connected to the hardware processor;

a productivity information calculator that calculates the productivity information from the output setting information received from the hardware processor through the second communication part, and transmits the productivity information to the hardware processor through the second communication part;

a warm-up processor that starts the warm-up processing in accordance with a notification of the start of the warm-up processing received from the hardware processor through the second communication part; and an image forming part that forms image at a time when a notification of the print start is transmitted from the hardware processor through the second communication part, after the warm-up processing is completed.

10. A hardware processor comprising:
a rasterization processing time predictor that predicts a rasterization processing time required for rasterization processing for each page of input data;

an output setting information extractor that extracts output setting information from print information about each page, the output setting information relating to productivity of the hardware processor;

a warm-up start time calculator that calculates a warm-up start time at which warm-up processing is started, to set an end time of the warm-up processing at an earlier time than an end time of the rasterization processing time, in accordance with productivity information about the hardware processor, the productivity information being calculated from the output setting information;

a warm-up start notifier that issues a notification of a start of the warm-up processing, when a current time reaches the warm-up start time;

a warm-up processor that starts the warm-up processing in accordance with the notification of the start of the warm-up processing;

a rasterization processor that performs the rasterization processing for each page;

a print start notifier that issues a notification of a print start, alter the warm-up processing is completed; and an image forming part that forms an image on a paper sheet at a time when the notification of the print start is received.

* * * * *